United States Patent [19]

Regis

[11] 3,793,619

[45] Feb. 19, 1974

[54] NAVIGATION AID AND DISPLAY SCREEN

[76] Inventor: Harry J. Regis, 85-24 Wareham Pl., Jamaica, N.Y. 11432

[22] Filed: May 26, 1972

[21] Appl. No.: 257,310

[52] U.S. Cl.................... 340/3 R, 340/3 C, 343/11
[51] Int. Cl............................................. G01s 9/68
[58] Field of Search............ 340/1 R, 3 C, 3 F, 3 R; 343/7.9, 10, 11

[56] References Cited
UNITED STATES PATENTS
3,307,141   2/1967   Saxton et al. ...................... 340/3 R
3,212,055   10/1965  Grieg .................................. 340/3 R Primary Examiner—Richard A. Farley
Attorney, Agent, or Firm—Darby & Darby

[57] ABSTRACT

A device for determining and simultaneously displaying the depth, range and bearing to points on the underlying terrain from a boat. A signal is transmitted at a known negative deflection angle and a known bearing angle and the time for the signal to reflect from an object on the underlying terrain is measured. At the proper bearing position the obtained distance is displayed directly on a display screen having calibrated scales for converting the vector distance information into its component parts. The bearing angle is then varied and another signal is transmitted and displayed. The profile or contour of the underlying terrain may then be readily viewed.

8 Claims, 6 Drawing Figures

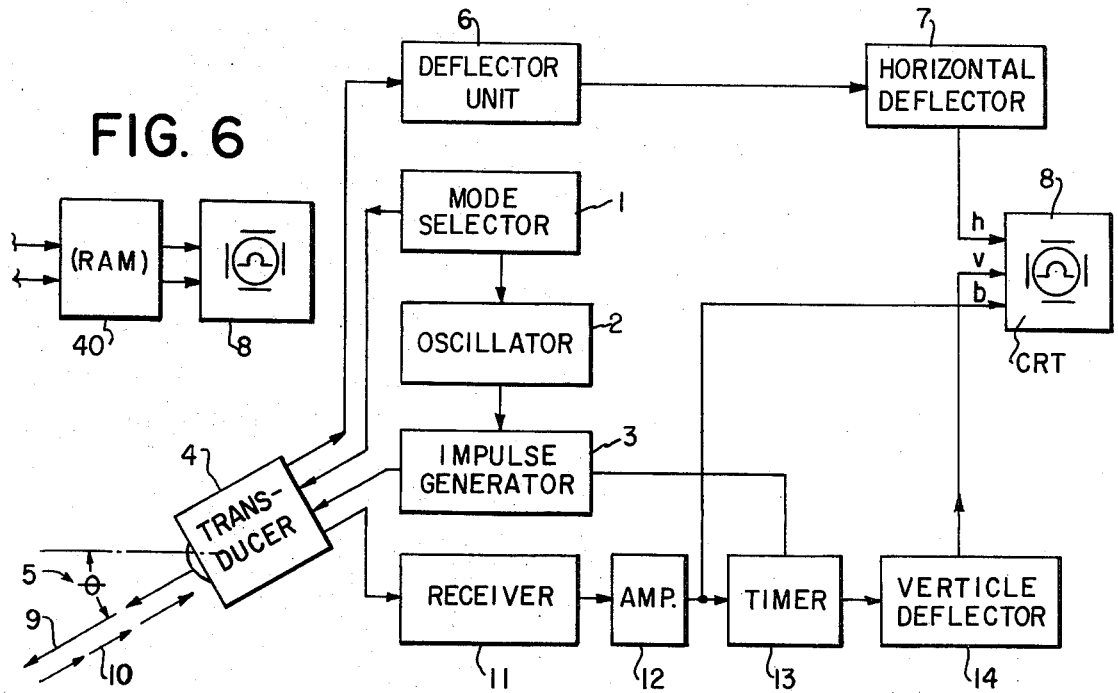
FIG. 6
FIG. 1
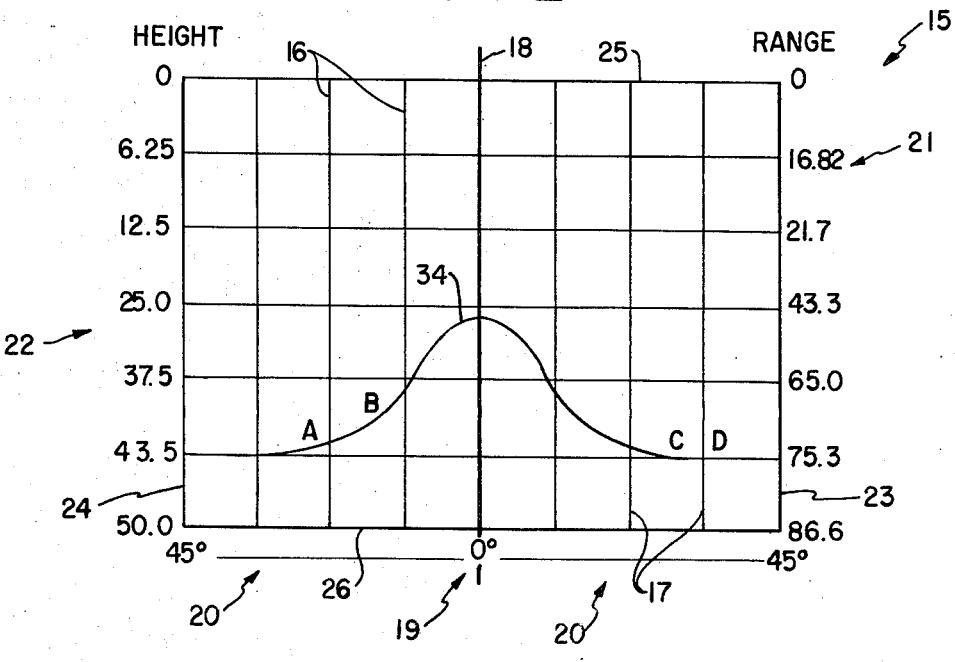
FIG. 2

NAVIGATION AID AND DISPLAY SCREEN

SUMMARY

The present invention is concerned generally with an electronic depth, range and bearing finder and display screen for use in a boat and in particular with such a system using sonic energy.

Many attempts at devising a display screen for use with a boat's navigational system that is inexpensive, easily interpreted, simple to operate and accurate have been unsuccessfully made. Also attempts to devise a display screen capable of giving information concerning the three parameters of depth, range and bearing have failed. Representative patents indicating prior display screens are U.S. Pat. Nos. 2,225,046, 2,729,765 and 3,122,719.

None of the prior display screens, however, were capable of displaying the three parameters of depth, bearing and range to a series of points. Also, the prior art does not reveal any device capable of portraying these three parameters simultaneously in such a way that the contour or profile of the underlying terrain may be readily viewed.

It is therefore an object of the present invention to provide a display screen capable of portraying three parameters of information — the bearing, depth, and range — at the same time.

Another object of this invention is to provide a display screen capable of portraying the profile or contour of the underlying terrain.

It is another object of this invention to provide a device which is inexpensive and simple to operate.

Another object is to provide a device for cooperation with the display screen which employs only a single output signal which is capable of determining both the range and depth to a point on the underlying terrain.

A further object is to provide a mounting means for a transducer that may be readily manipulated, thereby providing further freedom in the operation of the device.

It is yet a further object of the invention to provide a system for "refreshing" the display on the cathode ray tube.

BACKGROUND OF THE INVENTION

For purposes of simplifying the explanation of the device the description and operation of the preferred system using sonic energy will be given.

Sonic navigational aids operate on the principle that the velocity of sound in water is approximately 5,000 feet per second. Therefore, the time interval between the transmission of a sonic signal, such as that produced by a transducer, and the return of the reflected sonic signal will be proportional to the distance to the object. For example, assuming sound travels 5,000 feet per second, a time interval of 6 seconds from the time the sonic signal was sent until the reflected signal was received would indicate that the distance from the transmitting unit to the object from which the sonic signal was reflected is 15,000 feet. The signal took 3 seconds traveling at 5,000 feet per second to reach the object and an additional 3 seconds traveling at the same 5,000 feet per second to return to the receiving unit.

A timing circuit generates a voltage proportional to the interval of time that it takes the sonic signal to travel to the reflecting object and return. The value of the voltage is then directly displayed on a cathode ray tube or some other display screen that is calibrated to directly convert the voltage to a distance. Periodic sonic signals are transmitted to constantly up-date the information displayed on the screen.

SUMMARY OF THE INVENTION

In the preferred embodiment of the present invention an oscillating circuit drives a sonic transducer thereby producing sonic pulses of energy. The transducer is supported below the water line of a boat and is directed at a negative deflection angle from the horizon. The deflection angle of the direction of the transducer may be varied from one mode to another, however, during the scanning operation of the device the deflection angle of the transducer remains fixed. A gearing system is provided that permits the scanning head, which contains the transducer, to survey an oscillating arc in front of the boat.

A sonic pulse of energy is transmitted and strikes an object, either the bottom of the seabed or any other object. A portion of the energy is reflected back along the transmitted path to the transducer. It is not necessary that all of the energy be directed back towards the transducer in such a manner, but only that a small portion of such energy be so transmitted. A time base generator or any other timing device well known in the art measures the time interval between the transmission and the reception of the sonic signal. The voltage value of the timing device is then directly imposed as a vertical coordinate on a grid-like display screen of a cathode ray tube having a long persistence phosphor at the appropriate bearing angle as a horizontal coordinate. Indicia proportional to the tangent of the deflection angle represents the object's depth and range respectively. As the scanning head supporting the sonic transducer continues to scan, sonic pulses are repeatedly generated and displayed, thereby producing a profile of the underlying terrain.

The interval between sonic pulses must be great enough so that a particular sonic pulse has time enough to be transmitted and be received. The maximum number of pulses per second transmitted, therefore, will be depend on the depth of the water and the angle of the transmitting transducer. The repetition rate may be adjusted from a control on the display screen.

The position of the sonic transducer is synchronized with the signal to the horizontal deflection plates of the display screen. Therefore, the transmittal of a sonic pulse at a particular bearing angle will appear on the display screen at that same angle.

For a better understanding of the present invention together with further objects thereof, reference is made to the following description taken in connection with the accompanying drawings, and the scope of the invention will be pointed out in the appended claims.

In the drawings:

FIG. 1 is a schematic block diagram of the navigational aid system;

FIG. 2 is a front elevational view of the display screen with a display portraying the underlying terrain of FIG. 3;

FIG. 6 is a schematic block diagram showing an alternate embodiment of the navigational aid of FIG. 1.

DETAILED DESCRIPTION OF THE FIGURES

Figure 3:
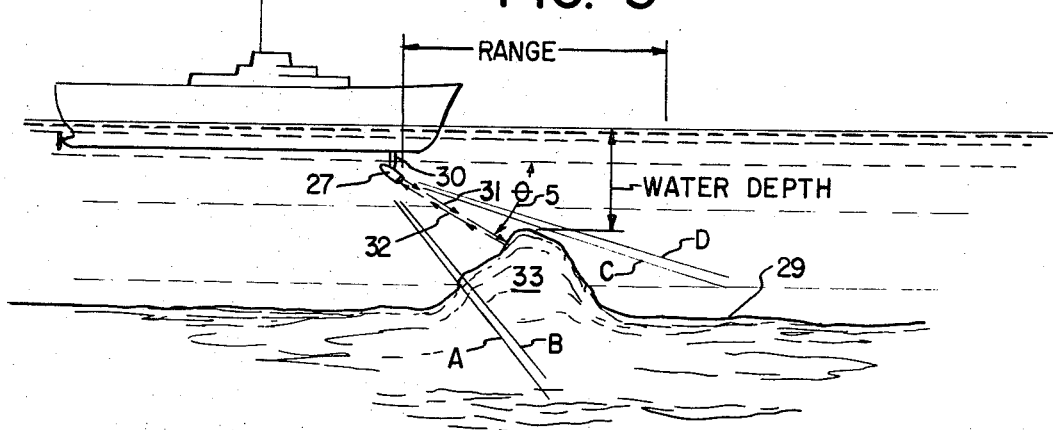
FIG. 3 is a perspective view of the device in use on a boat scanning the underlying terrain.

Referring now to FIG. 1 which is a block diagram of the system according to invention, a time mode selector switch 1 regulates the number of sonic pulses per second to be generated. The output from oscillator 2 regulates generator 3, the output of which controls sonic transducer 4. Transducer 4 is directed at a negative deflection angle 5 to the horizon. The transducer is at the same time capable of being oscillated in a horizontal plane. Deflection circuit 6 is provided and controls the input signal to horizontal deflection plate 7 of the cathode ray tube display screen 8 proportional to the bearing of sonic transducer 4. The transducer transmits a sonic signal 9, the reflection of which 10 is received by the transducer 4. The sonic energy is converted into an electrical signal and detected by receiver 11, amplified by amplifier 12 and transmitted to the beam modulation input of the cathode ray tube 8. Timer 13 receives a signal from generator 3. The signal from the timing circuit is next transmitted directly to vertical plates 14 of the cathode ray tube 8. Thus each echo detected by receiver 11 is displayed at its proper range and bearing coordinates. By repeating this process the depth, range and bearing to all objects are displayed.

In FIG. 2 is shown display screen 15, shown in detail as a generally rectangular grid formed on a cathode ray tube. The display screen may be broken up by a series of vertical 16 and horizontal 17 grid lines. Preferably, an accentuated vertical line 18 divides the grid into two halves. Indicia indicating the bearing of the transducer (and hence a detected object) is displayed parallel to a horizontal axis of the grid, the zero bearing 19 being on the accentuated vertical line. Relative bearing angles 20 are indicated to the right from the zero and to the left of such zero point. Along a vertical axis indicia indicating the range 21 and the depth 22 are provided. One set of indicia may be placed along a right hand vertical axis 23 while another of the sets may be placed along the left hand vertical axis 24. Zero height and zero range is indicated at the extreme upper horizontal axis 25 while the maximum depth and maximum range is indicated at the extreme lower horizontal axis 26.

The values of the indicia representing the depth and range may be changed to reflect the variation in the negative deflection angle of the transducer (generally set to conform to the maximum depth of the water). The values shown in FIG. 2 represents a transducer directed at a negative deflection angle of 30°.

The value of the indicia representing the (horizontal) range is proportional to the value of the indicia representing the depth. The exact mathematical relationship may be expressed as:

the value of range = value of depth/tan $\theta$ where $\theta$ is the negative deflection angle of the transducer. Slant range may be indicated rather than horizontal range in which case the proportionality factor would be sin $\theta$.

In FIG. 3, the device of FIG. 1 is shown determining the profile of the terrain 29 at a point in front of the boat. The transducer 27 is supported on a shaft 30 which is capable of oscillating the transducer. The transducer is directed at a negative deflection angle 5. Distance vector 31 to mound 33 is broken down into its component parts, depth and range, and are then displayed on display screen 34. The distance vectors A, B, C and D, are similarly displayed with their points indicated on the screen of FIG. 2 as A-D respectively.

The information displayed on the cathode ray tube shown may now be readily interpreted. The general shape of the profile corresponds generally to that of the sea bed as seen from the vessel. FIG. 2 indicates a bearing limit of 45° on either side of the center of the boat, but there is no requirement that the device be so limited. Valid results may be obtained for scans of up to 60° and 70° to either side of the bow.

As stated above, the profile of the sea bed is visually displayed on the screen. The depth of the water at any point may be read directly from the scale at the left of the screen. At 0° bearing, the depth of the water is about 25 feet. The range to the same point at 0° bearing is read directly from the scale along the right-hand edge of the screen as being approximately 44 feet. Likewise, point A indicates that at 20° bearing to the port of the boat the depth of the water is about 44 feet and the range about 74 feet. The remainder of the contour 34 may be similarly interpreted.

Conventional transducers may be employed in the underwater scanning head. It is contemplated that the angle of deflection of the sonic transducer may be any convenient angle between 0° deflection angle and 90° deflection angle. This may be accomplished by a single transducer and a single gearing system that varies the deflection angle of the sonic transducer. At the same time, the display indicating the depth and range of the target would be changed to reflect the different values of range and depth at different deflection angles.

Figure 4:
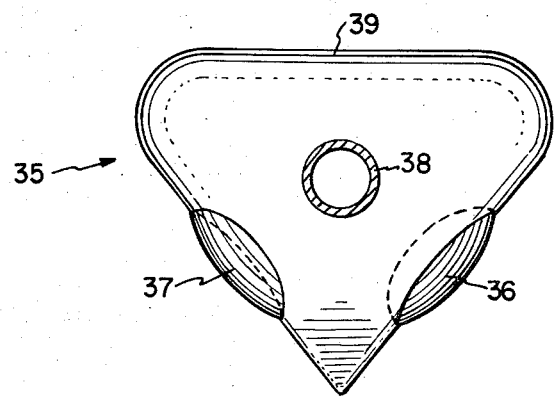
FIG. 4 is a top plan view of the scanning head.
Figure 5:
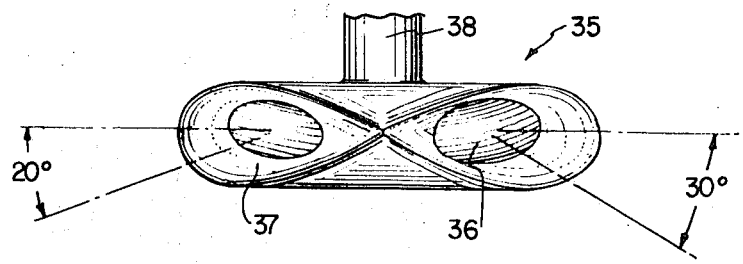
FIG. 5 is a front elevational view of the scanning head of FIG. 4.

In practice there is no need for an infinite variation in the deflection angle. In FIGS. 4 and 5, a scanning head 35 employing two transducers 36 and 37 having their deflection angle pre-set, is shown. The scanning head is rotatably mounted through its mounting collar 38. On the scanning head are fixed two transducers. One of the transducers 36 is permanently fixed directed at a 30° negative deflection angle, while the other transducer 37 is permanently directed at a 20° negative deflection angle. Of course, depending upon the particular use and circumstances, the two angles may differ so as to give a long range scan or a much shorter range scan. For example, one of the transducers may be fixed at a 10° negative deflection angle while the other may be fixed at a 60° angle.

During operation of the scanning device, the scanning head would be rotated so that the desired transducer would be facing the area of the sea bed to be scanned. Electrical or mechanical switches may be employed to deactivate the transducer not desired to be used. The remainder of the operation of the scanning device would be the same as previously described.

When the scanning device is not in use, the surface 39 of the triangular surface without a transducer is positioned so as to be directed towards the bow of the boat. This prevents strain or damage to the transducers and extends their life.

The above-described system described the use of a cathode ray tube with a long persistence phosphor for its display screen. Such a system has the defect that during long sweeps of the scanning head, the information displayed on the cathode ray tube early in the cycle has to a great extent dissipated. In order to eliminate or correct this defect, a random access memory (RAM) storage system shown in FIG. 6, 40 may be inserted in the device of FIG. 1. Such RAM systems are well known. The information received by the vertical deflection plates is synchronized with the information received by the horizontal deflection plates for each bit of data to be displayed on the cathode ray tube. This information is then stored at a particular memory address. This information is then repeatedly displayed on the cathode ray tube as the transducer continues to scan for fresh data. The repetition rate is much faster than is capable of being distinguished by the human eye so that the presentation of data appears to be continuous. When new information is received by the transducer, the prior information recorded in the memory address for that particular bearing is erased and the new information stored for display.

What is claimed is:

1. A navigational device comprising:
  a. a generally rectangular display screen having three sets of indicia, the first set of indicia indicating the range, the second set of indicia indicating the depth and the third set of indicia indicating the bearing,
  b. means for generating a signal proportional to the distance from the signal generating means to a reflecting object at a bearing angle $\phi$ and a negative deflection angle $\theta$ where $\phi$ is between 0° and ±90° and $\theta$ is between 0° and 90°,
  c. means for cyclically varying the bearing angle,
  d. means for generating a second signal proportional to a variation in the bearing angle $\phi$, and
  e. means for displaying said signals on said display screen so as to simultaneously display the range, depth and bearing to the reflecting object.

2. The navigational device of claim 1 in which the display screen has the first set of indicia indicating the range and the second set of indicia indicating the depth located along a vertical axes and the third set of indicia located along a parallel axis.

3. The navigational device of claim 2 in which the numerical value of the second set of indicia indicating the range is equal to the numerical value of the first set of indicia indicating the depth divided by the tan of the angle $\theta$.

4. The navigational device of claim 3 in which the third set of indicia indicating the bearing has the value of 0° bearing located at the mid-point of a horizontal axis.

5. The navigational device of claim 3 in which the signal generating means comprises at least one sonic transducer, capable of transmitting and receiving a sonic signal, means for converting a second sonic signal to an electrical current, timing means for timing the interval between the transmitting and reception of a signal.

6. The navigational device of claim 5 in which the display screen comprises a cathode ray tube and the signal proportional to the bearing angle controls the horizontal deflection of the electric beam and the signal proportional to the distance to a reflecting object controls the vertical deflection of the electron beam.

7. The navigational device of claim 5 in which there are at least two sonic transducers each of which directed at a different fixed negative deflection angle and switching means for selectively activating one of the sonic transducers.

8. A watercraft sonar system with panoramic display comprising:
  a. a directional sonar transmitter and receiver in an underwater rotatable housing, the directional axis of said transmitter and receiver being at a predetermined oblique angle to the horizontal,
  b. means for cyclically rotating said housing about a substantially vertical axis,
  c. means for generating pulse outputs from said transmitter at a rate much higher than the rotational rate of said housing,
  d. means for detecting echos received by said receiver and for generating a signal representative of the range corresponding to the echo time,
  e. means for generating a signal representing the bearing of said rotatable housing,
  f. a two dimensional display screen,
  g. means for displaying said bearing signal on the horizontal dimension of said screen,
  h. means for displaying said range signal on the vertical dimension of said screen,
  i. indicia along a horizontal dimension of said screen indicating bearing angles over a range of less than 180°,
  j. indicia along a vertical dimension of said screen indicating depth,
  k. and further indicia along a vertical dimension of said screen indicating horizontal range.

* * * * *